United States Patent [19]

Johnson

[11] Patent Number: 4,826,099

[45] Date of Patent: May 2, 1989

[54] AUTOMATIC CORD REEL FOR DUCK DECOYS

[76] Inventor: Rick J. Johnson, 2063 S. Logan, Denver, Colo.

[21] Appl. No.: 172,740

[22] Filed: Mar. 23, 1988

[51] Int. Cl.⁴ .................................................. B65H 75/48
[52] U.S. Cl. .................................................. 242/107; 43/3
[58] Field of Search .................. 242/107–107.7, 242/125.1, 125.2; 43/2, 3

[56] References Cited

U.S. PATENT DOCUMENTS

| | | | |
|---|---|---|---|
| 1,436,241 | 11/1922 | Davis | 242/107 |
| 1,789,649 | 1/1931 | Gazecki et al. | 43/3 |
| 2,678,778 | 5/1954 | Gibson | 242/96 |
| 2,747,814 | 5/1956 | Taylor | 242/107 |
| 3,224,706 | 12/1966 | Bastow | 242/107.13 |
| 3,245,635 | 4/1966 | Signor | 242/107 |
| 3,930,328 | 1/1976 | Knuth | 43/3 |
| 4,014,478 | 3/1977 | Boncina | 242/107 |

FOREIGN PATENT DOCUMENTS

| | | | |
|---|---|---|---|
| 63468 | 9/1955 | France | 242/125.2 |
| 686252 | 3/1965 | Italy | 43/3 |
| 686253 | 3/1965 | Italy | 43/3 |
| 776927 | 6/1957 | United Kingdom | 242/125.2 |

Primary Examiner—John M. Jillions
Attorney, Agent, or Firm—Douglass F. Vincent

[57] ABSTRACT

A cord reel device for automatically winding a decoy cord. In one example, a reel having a hollow center and a bore extending from the surface of the reel to the hollow center thereof is located within a housing which is attachable to a decoy. A rubber band extends through the reel's hollow center and is attached at either end to the housing. The decoy cord passes through the bore and is tied around the rubber band and a tab inserted into the midportion of the rubber band. When the cord is pulled, the reel unwinds to release the cord, thereby twisting the rubber band. The twisted rubber band exerts a torsional force on the reel which automatically rewinds the cord when the pulling force on the cord is sufficiently diminished.

4 Claims, 2 Drawing Sheets

AUTOMATIC CORD REEL FOR DUCK DECOYS

TECHNICAL FIELD

This invention relates to cord reels and more particularly to an automatic reel for winding a cord used as an anchor line for a duck decoy.

BACKGROUND ART

In the art and sport of duck hunting, the use of decoys is quite common, often in sizable numbers. Because in most circumstances hunters must set out and retrieve their decoys each day they hunt, besides possibly requiring repeated settings, for example due to a change in wind or relocating to a spot with more duck activity. Normally a cord of varied lengths is attached to the decoy on one end and to an anchor on the other, to keep the decoys in place. With the use of dozens of decoys, it becomes a tedious and time-consuming task to wrap the cord, with weights, in some fashion around the decoys so that they don't become entangled with one another when placed in a decoy bag or boat as such.

A number of arrangements of automatic reels for duck decoys and similar purposes are known in the prior art. In general, these reels are adequate for their intended purpose. However, ease and simplicity of manufacture, operation, and maintenance are of great importance for such reels.

It is accordingly an object of this invention to provide an automatic cord reel for duck decoys which is easy to manufacture, simple and efficient to operate, and is easily and quickly adjusted or repaired.

DISCLOSURE OF THE INVENTION

In accordance with the present invention, a cord reel device for automatically winding a duck decoy cord is provided. This device includes a housing which has a clip for attachment to the decoy. A reel located within the housing has a hollow center and a bore extending from the surface of the reel to the hollow center. A continuous elastic band, such as a common rubber band, extends through the hollow center of the reel and is attached to the housing on opposite sides of the reel. One end of the decoy cord passes through the bore to the hollow center of the reel where it is tied around the elastic band and a tab inserted into the mid-portion of the band. When the cord is unwound from the reel, the elastic band is twisted and the resulting torsional forces tend to rewind the cord when pulling forces on the cord are diminished.

Additionally, an eyelet may be provided in the housing for guiding the cord out of the housing. This helps prevent tangling problems with the reel and the cord. Further, a second elastic band may be secured to the cord beyond the eyelet, preferably near the anchor. This band facilitates setting up and retrieving the decoys by attaching to the housing and preventing undesired unwinding of the decoy cord.

From the foregoing, a number of advantages of the present invention are readily apparent. A unique automatic cord reel for duck decoys is provided which is easily constructed, simple and efficient to use, and may be readily adjusted or repaired by anyone, without requiring the use of tools.

Additional advantages of this invention will become readily apparent from the description which follows, together with the accompanying drawings.

BEST MODE FOR CARRYING OUT THE INVENTION

Figure 1:
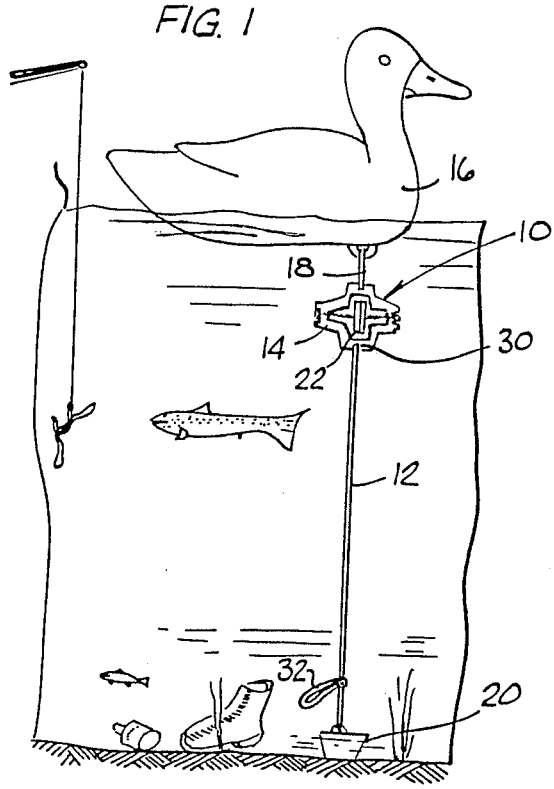
FIG. 1 is a perspective view of the cord reel in place on a duck decoy.
Figure 2:
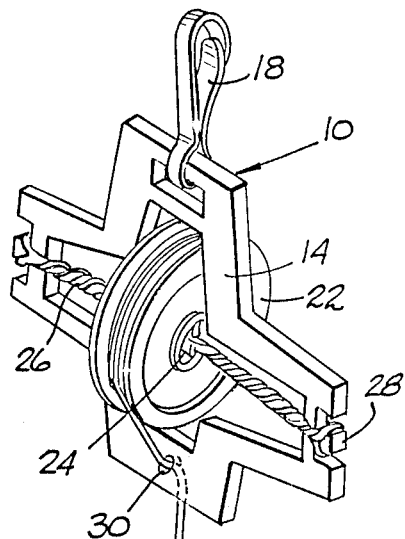
FIG. 2 is a perspective view of the cord reel, showing the cord partially extended.
Figure 3:
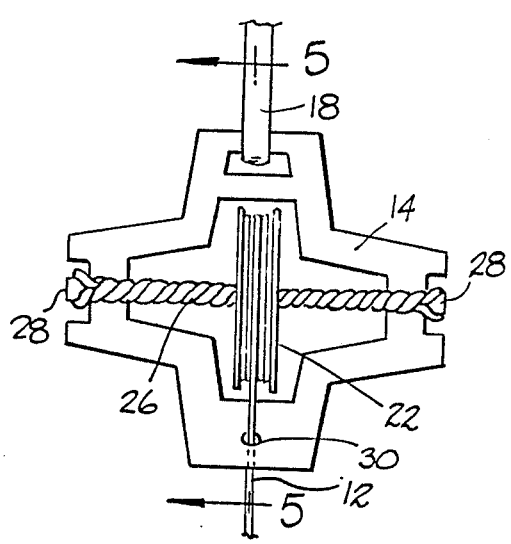
FIG. 3 is a front view of the reel and housing.
Figure 4:
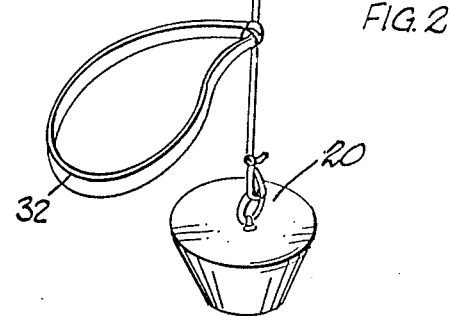
FIG. 4 is a broken perspective view of the elastic band terminals.

In accordance with the present invention, as shown in FIGS. 1–4, an automatic reel device 10 is provided for winding a duck decoy cord 12. The device 10 includes a housing 14 which is attached to a decoy 16 by an attachment clip 18 preferably mounted to the housing 14 near its top. FIG. 1 shows the cord 12 in the unwound position anchored to the bottom of the water by anchor 20. The cord 12 is wound around reel 22 which has a hollow center 24. An elastic band 26, which may be an ordinary rubber band, passes through the hollow center 24 and is attached to terminals 28 on opposite sides of the reel 22. For best results, eyelet 30 may be provided in housing 14 for guiding the cord 12 as it winds and unwinds. Additional elastic band 32 is provided to aid in setting and moving the reel device 10, as will be described below.

Figure 5:
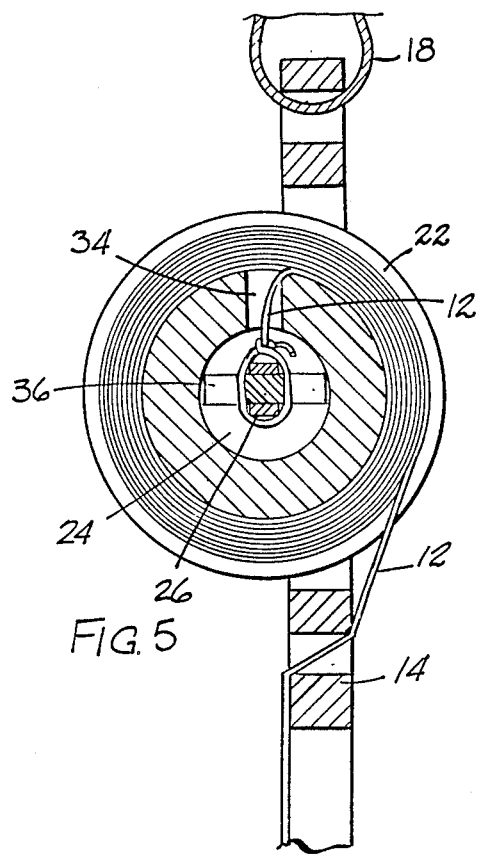
FIG. 5 is a sectional view of the reel taken along line 5—5 of FIG. 3, showing the arrangement of the cord, tab, and elastic band.
Figure 6:
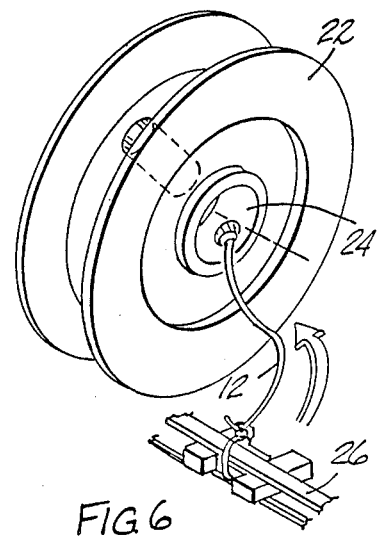
FIG. 6 is a perspective view of the arrangement of the cord, tab, and elastic band immediately prior to passing the band through the hollow center of the reel.
Figure 7:
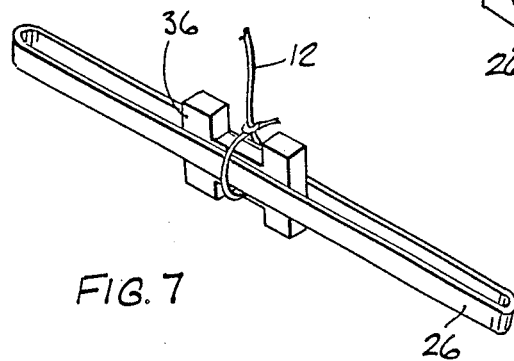
FIG. 7 is an enlarged perspective view of the cord, tab, and band.
Figure 8:
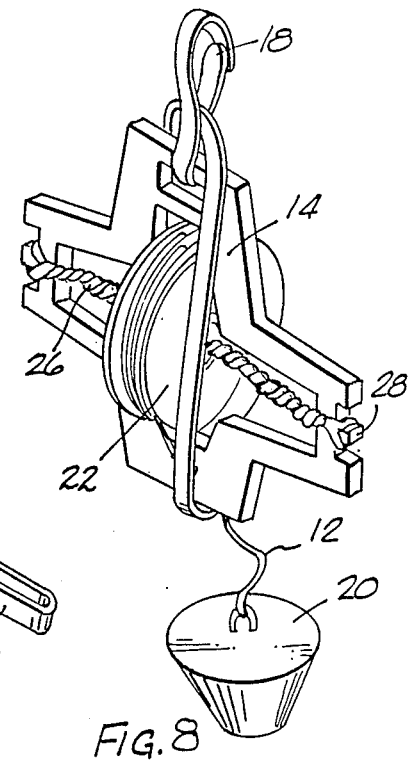
FIG. 8 is a perspective view of the reel showing the use of the additional elastic band.

FIGS. 5–7 depict the attachment of the cord 12 to the elastic band 26. To accomplish this, one end of the cord 12 must first be passed through bore 34 which extends from the surface of the reel 22 to its hollow center 24. Tab 36 is then inserted into the mid-portion of elastic band 26 and the cord 12 is tied around both the band 26 and the tab 36, as best illustrated in FIG. 7. Once this connection has been secured, the elastic band 26 may be passed through the hollow center 24 and attached at its end to terminals 28, as shown in FIG. 6. To prevent undesired unwinding of the cord 12, additional elastic band 32 may be attached to clip 18, as shown in FIG. 8.

This invention has been described in detail with reference to a particular embodiment thereof, but it will be understood that various other modifications can be effected within the spirit and scope of this invention.

I claim:

1. A cord reel device for automatically winding a decoy cord comprising:
   a housing having means for attachment to a decoy;
   a reel located within said housing said reel having a hollow center and a bore extending from the surface of said reel to said hollow center, said cord having an end extending through said bore to said hollow center;
   a continuous annular elastic band extending through the hollow center of said reel;
   means for securing said elastic band to said housing on opposite sides of said reel; and means for securing said cord to said elastic band, said reel being fully movable on winding of said cord and being torsionally biased by said elastic band to rewind said cord.

2. A cord reel device as claimed in claim 1, wherein said means for securing the cord to the elastic band includes:

a tab inserted through said elastic band at the mid-portion thereof with said end of said cord being tied around the tab and the mid-portion of the elastic band.

3. A cord reel device as claimed in claim 1, further including:

an eyelet in said housing for guiding said cord out of said housing.

4. A cord reel device as claimed in claim 3, further including:

another elastic band secured to said cord beyond said eyelet.

* * * * *